(12) United States Patent
Heizmann et al.

(10) Patent No.: US 8,073,982 B2
(45) Date of Patent: Dec. 6, 2011

(54) METHOD FOR SETTING AN OPERATING PARAMETER A PERIPHERAL IC AND DEVICE FOR CARRYING OUT SAID METHOD

(75) Inventors: Friedrich Heizmann, Villingen-Schwenningen (DE); Thomas Schwanenberger, St. Georgen (DE); Patrick Lopez, Livré sur Chengeon (FR)

(73) Assignee: Thomson Licensing, Boulogne-Billancourt (FR)

( * ) Notice: Subject to any disclaimer, the term of this patent is extended or adjusted under 35 U.S.C. 154(b) by 483 days.

(21) Appl. No.: 10/500,205
(22) PCT Filed: Dec. 14, 2002
(86) PCT No.: PCT/EP02/14267
§ 371 (c)(1), (2), (4) Date: Jun. 28, 2004
(87) PCT Pub. No.: WO03/056443
PCT Pub. Date: Jul. 10, 2003

(65) Prior Publication Data
US 2005/0096755 A1  May 5, 2005

(30) Foreign Application Priority Data
Dec. 28, 2001 (DE) .................. 101 64 338

(51) Int. Cl.
G06F 3/00 (2006.01)
G06F 13/00 (2006.01)
G06F 5/00 (2006.01)
G06F 13/12 (2006.01)
G06F 1/24 (2006.01)
G06F 1/00 (2006.01)
H04B 1/40 (2006.01)
H04B 17/02 (2006.01)
H04B 1/06 (2006.01)
H01Q 11/12 (2006.01)
H04M 3/00 (2006.01)

(52) U.S. Cl. .................. 710/8; 710/29; 710/33; 710/52; 710/58; 710/62; 710/104; 713/100; 713/322; 713/500; 713/501; 712/28; 455/77; 455/87; 455/127.2; 455/136; 455/232.2; 455/355; 455/418

(58) Field of Classification Search ......................... None
See application file for complete search history.

(56) References Cited

U.S. PATENT DOCUMENTS
3,749,889 A * 7/1973 Vaskunas et al. ............. 235/474
(Continued)

FOREIGN PATENT DOCUMENTS
EP 1071228 1/2001

OTHER PUBLICATIONS

IEEE 100—The Authoritative Dictionary of IEEE Standards Terms (Seventh Edition). New York: IEEE, 2000, p. 1029.*
(Continued)

Primary Examiner — Ilwoo Park
Assistant Examiner — Henry Yu
(74) Attorney, Agent, or Firm — Robert D. Shedd; Joseph J. Opalach; Jerome G. Schaefer

(57) ABSTRACT

The invention relates to a method for setting an operating parameter in a peripheral IC. In this method, the operating parameter is transmitted from a central IC via a bus connection to the peripheral IC. The method is characterized in that the operating parameter is initially buffered in a preregister in the peripheral IC, and in that the buffered operating parameter is transferred into a working register only if a transfer signal is sent from the central IC via the bus connection. This method has the advantage that, for example in the case of rapidly changing receive conditions in a send/receive unit, adjustment of the send or receive gain setting is very flexible, and it is easy to avoid an incorrect setting due to a detected signal fluctuation. The invention also relates to a device for carrying out said method.

5 Claims, 3 Drawing Sheets

U.S. PATENT DOCUMENTS

| | | | | |
|---|---|---|---|---|
| 4,547,849 A * | 10/1985 | Louie et al. | | 710/3 |
| 5,428,748 A * | 6/1995 | Davidson et al. | | 710/9 |
| 5,537,581 A * | 7/1996 | Conary et al. | | 713/501 |
| 5,664,166 A * | 9/1997 | Isfeld | | 713/501 |
| 5,737,524 A * | 4/1998 | Cohen et al. | | 710/301 |
| 5,737,633 A * | 4/1998 | Suzuki | | 710/29 |
| 5,991,888 A * | 11/1999 | Faulkner et al. | | 713/501 |
| 6,038,651 A * | 3/2000 | VanHuben et al. | | 712/21 |
| 6,073,244 A * | 6/2000 | Iwazaki | | 713/322 |
| 6,111,814 A * | 8/2000 | Schaefer | | 365/233.5 |
| 6,128,311 A * | 10/2000 | Poulis et al. | | 370/463 |
| 6,163,832 A * | 12/2000 | Okajima | | 711/169 |
| 6,167,475 A * | 12/2000 | Carr | | 710/113 |
| 6,457,264 B2 * | 10/2002 | Fusco et al. | | 36/67 D |
| 6,717,516 B2 * | 4/2004 | Bridgelall | | 340/572.1 |
| 6,826,369 B1 * | 11/2004 | Bondarev et al. | | 398/107 |
| 7,120,427 B1 * | 10/2006 | Adams et al. | | 455/418 |
| 2002/0168037 A1 * | 11/2002 | Chen | | 375/344 |

OTHER PUBLICATIONS

Profibus Nutzerorganisation E.V.: "PROFIBUS Technical Description" Sep. 1, 1999, pp. 1-36.

R.G. Arnold et al: "Silicon MCM-D Technology for RF Integration", Multichip Modules, 1997, Int'l Conference on Denver, Co. USA Apr. 2-4, 1997, New York, NY USA, IEEE, pp. 340-344.

Search Report Dated Mar. 19, 2003.

* cited by examiner

METHOD FOR SETTING AN OPERATING PARAMETER A PERIPHERAL IC AND DEVICE FOR CARRYING OUT SAID METHOD

This application claims the benefit, under 35 U.S.C. §365 of International Application PCT/EP02/14267, filed Dec. 14, 2002, which was published in accordance with PCT Article 21(2) on Jul. 10, 2003 in English and which claims the benefit of German patent application No. 10164338.1, filed Dec. 28, 2001.

The invention relates to a method for setting an operating parameter in a peripheral IC, where the operating parameter is transmitted from a central IC to the peripheral IC via a bus connection. The invention also relates to a device for carrying out said method.

BACKGROUND TO THE INVENTION

There is a continuous and even growing trend to increase the digitization of electrical devices in the household and in the field of consumer electronics. As part of this development, much effort is also being made to network the different digital devices in the household and thereby further increase their functionality. Wire-based bus systems such as the IEEE1394 bus, Powerline bus, USB bus, Ethernet, etc. are already specified and have been available for quite some time.

However, intensive work is also being conducted into standards for wireless networking of devices in the household. The so-called HIPERLAN Type 2 is cited as an example of a system which allows wireless networking of devices. In fact, this system has already been specified in an ETSI/BRAN standard. The exact title of this ETSI standard is Broadband Radio Access Networks (BRAN); High Performance Radio Local Area Network (HIPERLAN) Type 2. The complete standard comprises a number of parts, each of which can be ordered from ETSI in its latest version. Transmission of data as per this system takes place in the 5 GHz range. HIPERLAN2 devices contain a corresponding HIPERLAN2 interface which offers both send and receive functionality. The maximum speed of data transmission on a single channel is 32 megabits per second. This is achieved using a powerful Orthogonal Frequency Division Multiplexing (OFAM) transmission method. The following digital modulation methods can be used for the various subcarriers: BPSK, QPSK, 16QAM, and optionally 64QAM. With these digital modulation methods, it is vital when receiving that the signal amplitude at the demodulator input is set in a defined manner. Since the HIPERLAN2 interface is essentially constructed with two integrated circuits, one of which (the so-called front-end IC) is an analog IC, with the tuner and the mixer circuits, and the other of which (the baseband processor) is a digital IC, the actual signal amplitude is determined in the digital IC, but the receive gain has to be set in the analog IC. For this purpose, it must therefore be possible to transmit data from the digital IC to the analog IC. Fluctuations in the gain setting as the result of applying setting values which transpire to be unreliable should also be avoided whenever possible. There is also a requirement for a simple bus connection between the digital IC and the analog IC, with as few wires or lines as possible. Since it is preferable for the gain setting to become effective without lengthy delays, data transmission must also be very fast.

INVENTION

The invention meets the aforementioned requirements with the measures as claimed in claims 1 and 4. The aforementioned setting fluctuations are reliably avoided by including a preregister in the analog IC (subsequently also referred to as the peripheral IC) in addition to the working register for the receive gain setting. Said preregister can buffer a setting value which is transmitted via the bus connection between the analog IC and the digital IC. This setting value is transferred to the working register only if a corresponding transfer signal (validity signal) is sent from the digital IC (subsequently also referred to as the central IC) via the bus connection. If, during transmission of a setting value, it becomes apparent in the baseband processor that the setting value which has been sent was actually unstable or another setting value was determined, the baseband processor can decide not to transmit the transfer signal for the previous setting value and instead transmit the new setting value to the analog IC directly. This value is then used to overwrite the content of the preregister, and the previously written value is not therefore used. The setting value contained in the preregister is transferred to the working register and the changed gain setting can become effective only if the transfer signal is sent via the bus connection. It is possible for one setting value to be written more than once successively to the preregister, without a transfer to the working register taking place. Consequently, a current setting value is always contained in the analog IC so that it is possible to respond quickly to changed receive conditions, but if it becomes apparent that it would be better to retain the previously existing value in the working register, the setting value which has been transmitted can still be suppressed quickly. The process for setting the receive gain is therefore very flexible as required by the digital modulation method.

The dependent claims contain advantageous developments and improvements to the method and device according to the invention. The bus connection between the peripheral IC and the central IC is advantageously implemented as a serial bus connection with a data line, a control line and a clock line, where the transfer signal is transmitted via the control line. This serial bus connection requires only three lines, thereby ensuring low circuit complexity and reducing the possibility of interference signals being introduced. The control line of the serial bus connection is also used advantageously to transmit the start signal for a data transmission from the central IC to the peripheral IC. Therefore the control line has a dual function.

DRAWINGS

An examplary embodiment of the invention is shown in the drawings and explained in greater detail in the following description.

Figure 3:
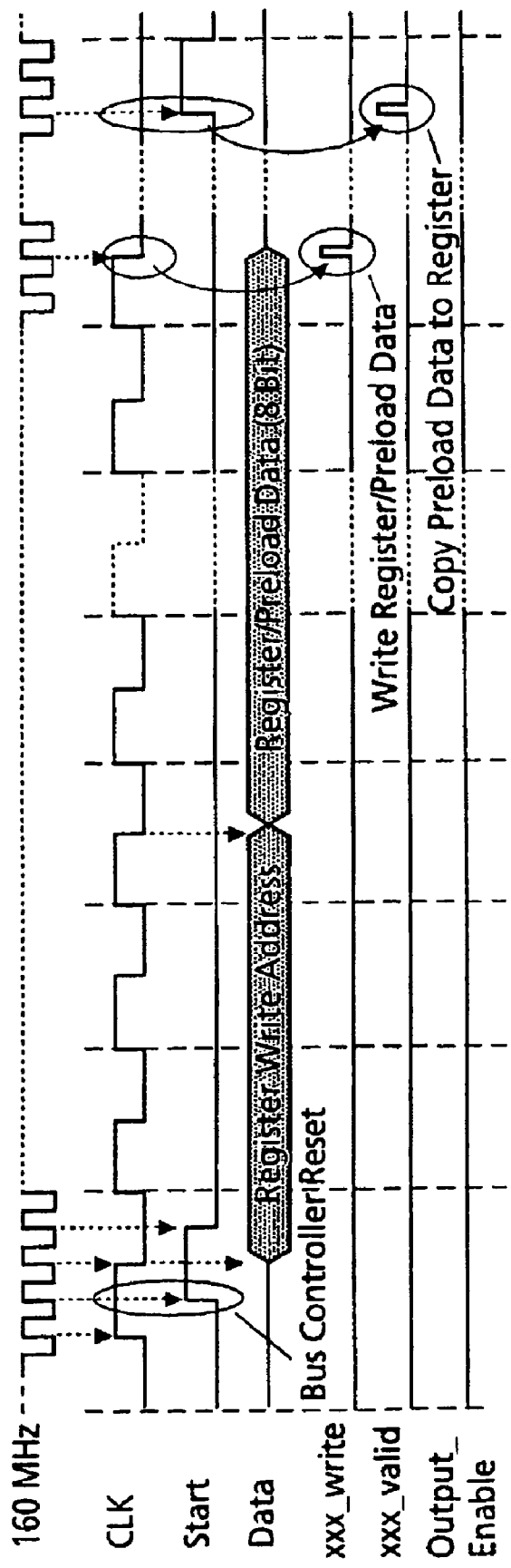
Figure 4:
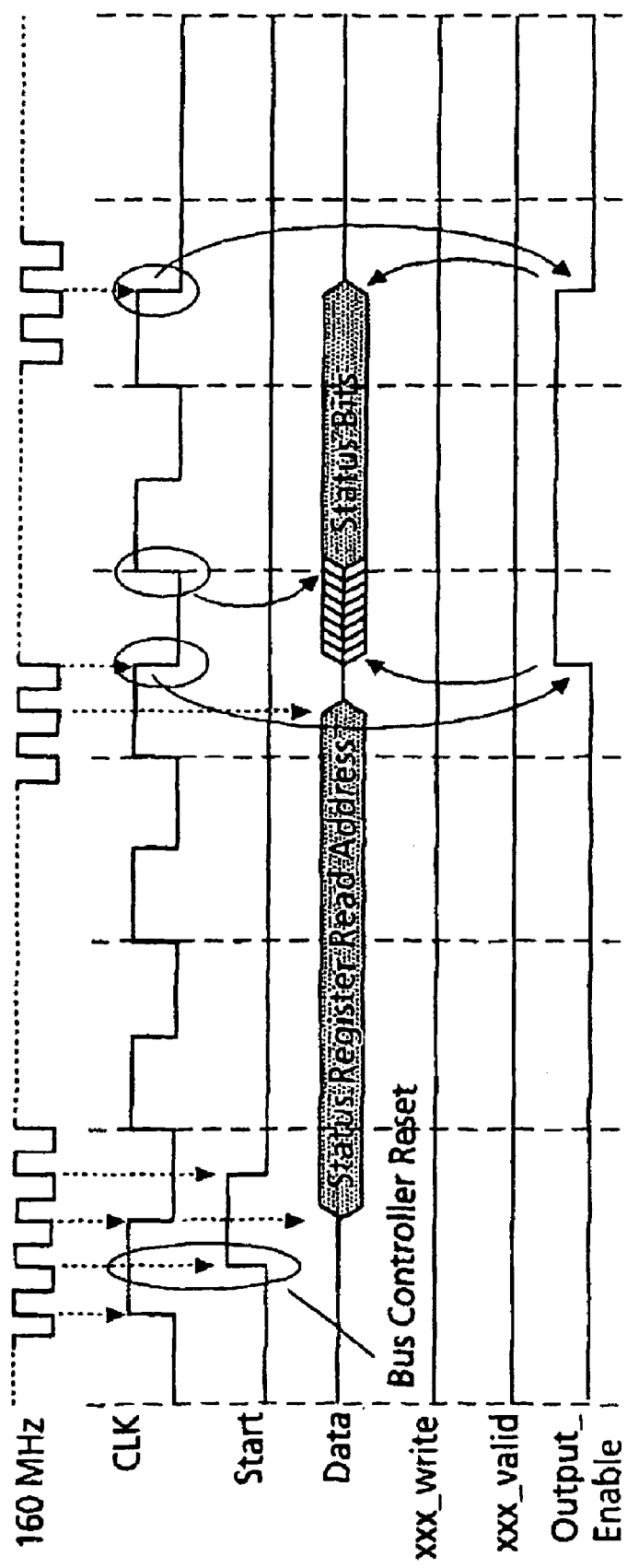

FIG. 3 a signal diagram for a data transmission from the central IC to the peripheral IC;

FIG. 4 a signal diagram for a data transmission from the peripheral IC to the central IC.

EXAMPLARY EMBODIMENT OF THE INVENTION

Figure 1:
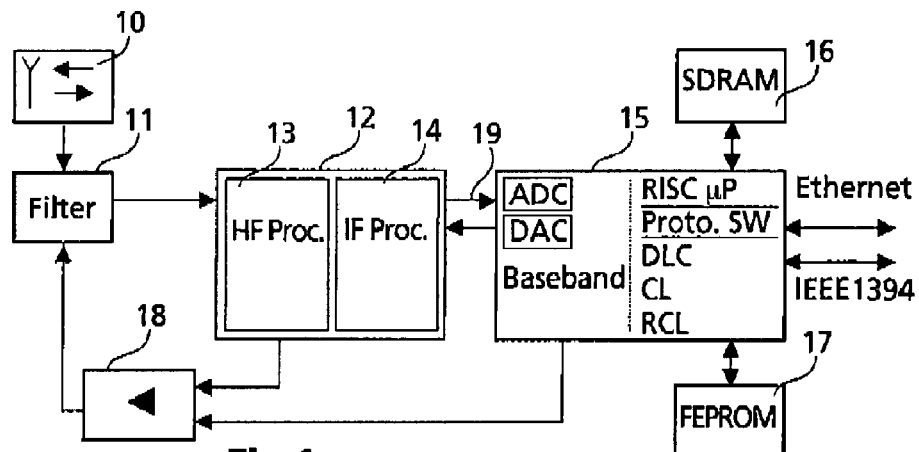
FIG. 1 shows a block diagram of the device according to the invention.

FIG. 1 shows the components of a HIPERLAN2 interface in a block diagram. The reference symbol 10 indicates the antenna or antenna system with a changeover switch between receive mode and send mode. The reference symbol 11 indicates the discrete components in which the RF signal is processed, including the send and receive filters and the balancing transformer between the antenna cable (coaxial cable) and the front-end IC 12. The front-end IC 12 is divided into an RF part 13 and a converter part 14 for generating the intermediate frequency. The dual conversion superheterodyne principle with conversion to a first and a second intermediate frequency is preferably implemented in the receive circuit, in order to reliably prevent image frequency reception. The send and receive paths have separate filter and amplifier stages. Two separate PLL synthesizer tuners are used for tuning on the send and receive paths. A further component of the front-end IC 12 is the serial bus interface for data transmission to and from the central IC 15. The output amplifier for the send path is indicated in FIG. 1 by the reference symbol 18, and is a discrete component to the front-end IC as outside. Said output amplifier can be set by the central IC 15 via an analog line. Fine adjustment of the receive gain is however achieved by means of the additional send amplifiers in the RF section 13 of the front-end IC. The amplifiers for the receive path are provided in the front-end IC and are adjustable. The front-end IC 12 does not have a dedicated clock generator for transferring setting values to the relevant working registers. Therefore this clock is transmitted via the serial bus connection 19.

The main component of the central IC 15 is a powerful processor, which uses software to implement the upper layers of the HIPERLAN2 protocol. In particular, this concerns the layers above the network layer (data link control layer). The same processor is also responsible for modulation and demodulation of the signals to be sent or received using the OFDM method. Another integrated component of the central IC 15 is the AD converter, which converts the intermediate frequency signal, that is output by the front-end IC 12, to a digital signal. The central IC 15 likewise contains a DA converter, which converts the digitally modulated signal to a corresponding analog signal. An external SDRAM memory module 16 is provided for storing data. The necessary software programs are stored in the flash memory 17, which is also external. Bus connections for an IEEE1394 bus interface or an Ethernet bus interface are also provided on the central IC 15.

Figure 2:
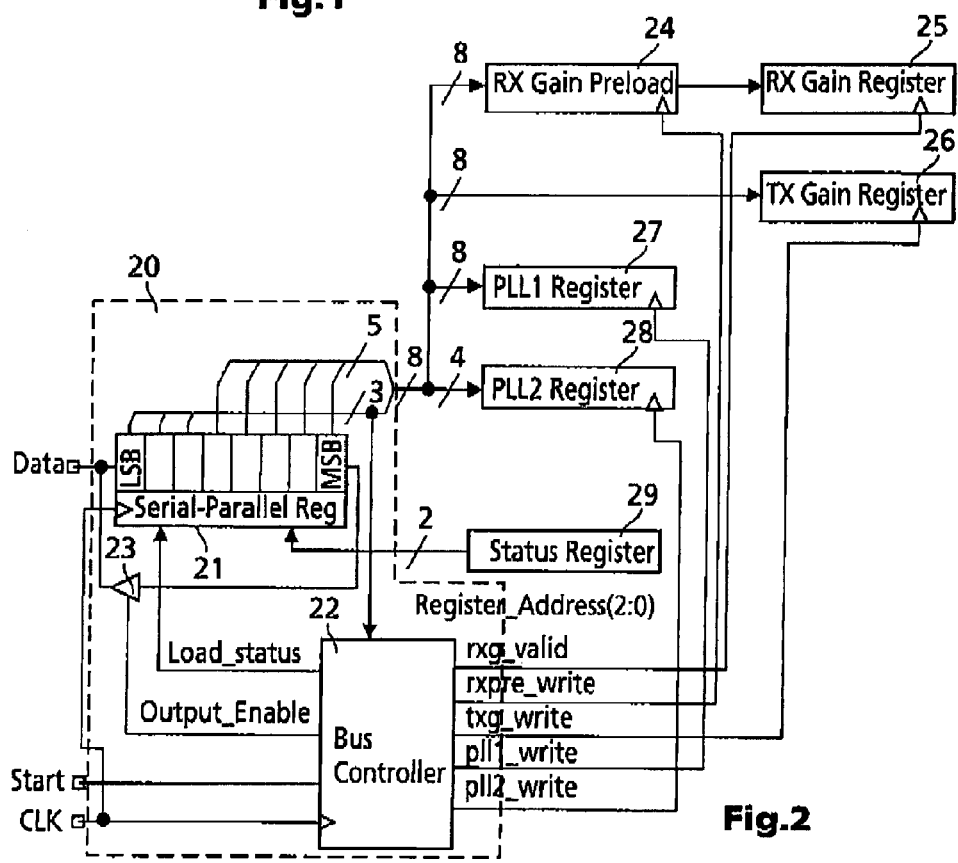
FIG. 2 shows a block diagram of the bus interface for data transmission between the central IC and the peripheral IC, and the control registers connected to it in the peripheral IC.

FIG. 2 shows one part of the front-end IC 12, specifically the bus interface 20 and the status and setting registers that are connected to it. The bus interface 20 comprises a shift register 21 having a register width of 8 bits and a bus controller 22 which can be implemented using corresponding hardware as a status function. The bus driver 23 is also shown as a separate component and is activated for the send mode from the peripheral IC to the central IC. As previously mentioned, the bus connection itself comprises three lines. The data transmission line Data is directly connected to the input of the shift register 21. The output of the bus driver 23 is also connected to this data line. Conversely, the output of the shift register 21 is connected to the input of the bus driver 23. The control line of the bus connection is shown by the word Start in FIG. 2. This line is connected to the bus controller 22. Since the front-end IC does not contain a dedicated clock generator, a clock line (CLK) is provided as a third line on the bus connection in order to prevent interference effects on the RF signal. This is connected to both the clock input of the shift register 21 and the bus controller 22. In addition to the status register 29 with a width of 2 bits, the front-end IC includes a PLL1 register 27 with a width of 8 bits and a PLL2 register 28 with a width of 4 bits. The PLL1 register 27 is used to set the PLL, which stabilizes the frequency for converting the RF signal to the first intermediate frequency during the receive mode, or stabilizes the frequency for converting the intermediate frequency signal to the RF signal during these send mode.

The setting value in the PLL2 register 28 is used as appropriate to set the PLL, which stabilizes the frequency for the mixer, which convert the receive signal at the first intermediate frequency to the receive signal at the second intermediate frequency. During the send mode, the setting is value is used to stabilize the frequency for the mixer when converting the send signal at the second intermediate frequency to the send signal at the first intermediate frequency.

Both PLL registers 27 and 28 are read-only registers. The parallel outputs of the PLL registers 27 and 28 are hard wired to the corresponding programmable frequency dividers (not shown). The lock status for both PLLs is entered into the status register 29.

The front-end IC 12 also contains a TXGain register 26. This likewise has a width of 8 bits. The gain setting for the send mode is written to this register. The parallel outputs of the register are hard-wired to different send amplifiers accordingly (not shown).

In addition, an RXGain register 25 is provided for the receive mode. This is the working register for the receive gain setting. It also has a width of 8 bits. The parallel outputs of this RXGain register 25 are hard-wired to corresponding receive amplifiers in the RF path (not shown). According to the invention, a second register is also provided for the receive gain setting and functions as a preregister. This is shown as the RXGain Preload register 24 in FIG. 2. It has a width of 8 bits, like the RXGain register 25. The parallel outputs of this RXGain Preload register 24 are connected to the corresponding parallel inputs of the RXGain register 25. The parallel inputs of registers 24, 26, 27 and 28 are connected to the parallel outputs of the shift register 21. In this configuration, the PLL2 register 28 is connected only to the four most-significant bits of the shift register 21. The three least-significant bits of the shift register 21 are also connected separately to the bus controller 22. These three bits are used to transmit the register write address during data transmission from the central IC to the peripheral IC. The write operation to one of the write registers 24, 26, 27 and 28 will now be described in greater detail.

The address lines for the write registers 24, 25, 26, 27 and 28 are also shown in FIG. 2 and lead from the bus controller 22 to the relevant register. They also function at the same time as a write-enable signal, so that data waiting at the parallel inputs can be transferred to the register.

In the case of the status register 29, an address line to this register and a corresponding read signal can be omitted, since the parallel outputs of the status register are permanently connected via multiplexers to the two most-significant bits of the shift register 21, and transfer of the status register content to the shift register 21 can be effected by means of an enable signal (Load_Status) to the multiplexers from the bus controller 22 end.

The data transmission process for an operating parameter from the central IC 15 to the front-end IC 12 will now be described in greater detail, with reference to the signal diagram in FIG. 3. The top line of FIG. 3 shows the system clock with which the central IC 15 works. The clock frequency is 160 MHz. This is used to derive the clock CLK for data transmission between the peripheral and the central IC. The system clock is stepped down by a factor of 4 for this purpose, thereby giving a clock frequency of 40 MHz for the data transmission. The data transmission is started by the central IC 15 by sending a start pulse on the start line Start. As shown in FIG. 3, the length of the start pulse corresponds to half the clock pulse period of the data transmission clock at 40 MHz. The rising edge of the start pulse resets the bus controller 22 if the High potential on the clock line is detected at the same time. Starting with the trailing edge of the bus clock following the rising edge of the start pulse, the register write address for the write operation is transmitted on the data line Data. The sampling instant for each bit is symbolized by a vertical dashed line. This vertical dashed line coincides with the rising edge of the bus clock (CLK) in each case. The clock cycles after the start pulse are counted in the bus controller 22. With the trailing edge of the third clock cycle after the start pulse, the register write address which is represented by the three least-significant bits of the shift register 21 is decoded internally in the bus controller 22, and a reservation flip-flop for the corresponding address line is set internally in the bus controller 22. Data transmission of the register write address is immediately followed by data transmission of the operating parameter. Eight bits are transmitted as an operating parameter in each case. Therefore a total of eleven bits are shifted into the shift register 21, of which only the last eight bits remain when the data transmission is complete. The first three bits, which relate to the register write address, have been shifted out of the shift register 21 by this time and are therefore no longer available. With the trailing edge of the last clock cycle of the transmission of the eight data bits, the bus controller 22 generates a write pulse xxx_write. This write pulse is routed in parallel to all address lines except for the address line (rxg_valid) which leads to the RXGain register 25. However, the write pulse is allowed through only on the address line which was previously selected by setting the reservation flip-flop when decoding the address. Consequently, the register write pulse reaches only the selected register, where it causes the data waiting at the parallel inputs of this register to be transferred into this register. If the selected register is the RXGain Preload register 24, then the setting value in this register does not yet have any effect on the receive gain setting at this time. In this case, the value held in the RXGain Preload register 24 is transferred to the RXGain register 25 only following a further pulse on the start line. This transfer pulse does not differ from the aforementioned start pulse on the start line. However, it should be noted that it can be distinguished from the start pulse by virtue of the fact that at the instant this pulse is generated the clock line (CLK) is switched to Low, whereas the High potential is present on the clock line (CLK) in the case of a valid start pulse. It is therefore possible to generate a copy pulse on a further line (xxx_valid) by logically combining the clock line and the start line, where this copy pulse is routed only to the address line of the RXGain register 25, and without previously setting a reservation flip-flop for this purpose. If security or safety considerations so require, the configuration can also be implemented in such a way that the copy pulse is allowed onto the address line of the working register only if the reservation flip-flop for the RXGain Preload register 24 has been set previously. During the whole write cycle, the control line Output_Enable of the bus controller 22 is deactivated, i.e. is at Low potential.

The operation for reading the status information in the peripheral IC 12 will now be described in greater detail, with reference to FIG. 4. This data transmission is also initiated from the central IC 15. The same designations are used for the lines in FIG. 4 as in FIG. 3. The central IC 15 again starts the data transmission with a start pulse on the start line. The status register read address is then transmitted to the front-end IC 12. The Output_Enable line of the bus driver 23 is activated by the trailing edge of the clock cycle in which the last address bit was transmitted. At the same time, the control line Load_Status is used to switch the multiplexers for the two most-significant bits of the status register 29, and the content of the status register 29 is copied into the two most-significant bits of the shift register 21 with the next rising edge of the bus clock. Since the bus driver is already switched on, transmission of the highest-order bit takes place via the bus line (Data) at the same time as this clock pulse. The next clock pulse triggers a shift operation in the shift register 21 and results in transmission of the second status bit. With the trailing edge of this clock cycle, data transmission to the central IC IS is terminated because the control line Output_Enable is reset to Low and therefore the bus driver 23 is disconnected. During transmission of the status information, the internal control lines xxx_write and xxx_valid in the bus controller 22 are deactivated, i.e. set to Low.

The invention is not restricted to the examplary embodiment described here. There is scope for many different adaptations and developments which are also considered to belong to the invention. For example, the invention could feature additional preregisters for additional setting registers if required. The corresponding bus controller 22 would have to be adapted accordingly. It is also conceivable to use a parallel bus connection instead of a serial bus connection between the peripheral and central IC. A different serial bus connection without a clock line, i.e. with asynchronous data transmission, is also possible. The register width of the setting registers and of the shift register can also be modified for different applications.

The invention claimed is:

1. A method for setting an operating parameter in a peripheral IC, the method comprising:
   transmitting the operating parameter from a central IC using synchronous data transmission via a bus connection to an IC, the bus connection being a serial bus connection having a data line, a control line, and a clock line, wherein a data transmission clock signal is derived from a system clock signal available to the central IC;
   buffering the operating parameter in a preregister of the peripheral IC in which said operating parameter does not have an effect on a working process of the peripheral IC, a current operating parameter being stored in a working register of the peripheral IC, said working process working with the current operating parameter stored in said working register;
   wherein the peripheral IC relates to a front-end IC for a communication arrangement for wireless data transmission and the central IC relates to a signal processing device, with means for one of modulation and demodulation of a mixed RF input signal and for further signal processing in baseband;
   wherein the operating parameter relates to a gain setting for a receive gain in the front-end IC;
   sending a start pulse signaling a start of a data transmission from the central IC to the peripheral IC via the control line; and
   sending a transfer pulse from the central IC to the peripheral IC via the control line, the transfer pulse triggering transferring of the buffered operating parameter to the working register, wherein the buffered operating parameter becomes active in said working process of the peripheral IC once written into said working register;
   wherein the start pulse is transmitted on the control line with a rising edge of the system clock signal during an active high state of the data transmission clock signal present on the clock line and wherein the transfer pulse is transmitted on the control line with a rising edge of the system clock signal when the data transmission clock signal is absent on the clock line.

2. The method according to claim 1, further comprising transferring a register write address for writing to the preregister in the peripheral IC on the data line ahead of the operating parameter.

3. A device for setting an operating parameter in a peripheral IC, the device comprising:
- a serial bus connection between a central IC and the peripheral IC, the serial bus connection having a data line, a control line, and a clock line for synchronous data transmission, wherein a data transmission clock signal is derived from a system clock signal available in the central IC;
- a preregister for buffering the operating parameter of the peripheral IC in which said operating parameter does not have an effect on a working process of the peripheral IC;
- a working register for storing a current operating parameter of the peripheral IC, said working process working with the current operating parameter stored in said working register;
- wherein the peripheral IC relates to a front-end IC for a communication arrangement for wireless data transmission and the central IC relates to a signal processing device, with means for one of modulation and demodulation of a mixed RF input signal and for further signal processing in baseband;
- wherein the operating parameter relates to a gain setting for a receive gain in the front-end IC
- means for transmitting a transfer pulse from the central IC to the peripheral IC over the control line, the transfer pulse triggering transferring of the buffered operating parameter to the working register, wherein the buffered operating parameter becomes active in said working process of the peripheral IC once written into said working register; and
- signaling means for transmitting a start pulse for data transmission from the central IC to the peripheral IC over the control line;
- wherein the start pulse is transmitted on the control line with a rising edge of the system clock during an active high state of the data transmission clock signal present on the clock line and wherein the transfer pulse is transmitted on the control line with a rising edge of a system clock signal when the data transmission clock signal is absent on the clock line.

4. The device according to claim 3, further including bus protocol means according to which a register write address for writing to the preregister is transferred to the peripheral IC on the data line ahead of the operating parameter.

5. The device according to claim 3, wherein the device is configured as a send and receive device for wireless data transmission in accordance with the HIPERLAN2 standard.

* * * * *